(12) United States Patent
Petty

(10) Patent No.: US 6,782,437 B2
(45) Date of Patent: Aug. 24, 2004

(54) METHOD OF COMMUNICATING ON A NETWORK

(75) Inventor: William K. Petty, Colorado Springs, CO (US)

(73) Assignee: LSI Logic Corporation, Milpitas, CA (US)

( * ) Notice: Subject to any disclaimer, the term of this patent is extended or adjusted under 35 U.S.C. 154(b) by 0 days.

(21) Appl. No.: 10/298,343

(22) Filed: Nov. 14, 2002

(65) Prior Publication Data

US 2003/0070017 A1 Apr. 10, 2003

Related U.S. Application Data

(62) Division of application No. 09/431,606, filed on Nov. 1, 1999.

(51) Int. Cl.[7] .............................................. G06F 13/00
(52) U.S. Cl. ...................................... 710/100; 710/300
(58) Field of Search ............................... 710/100, 300, 710/305

(56) References Cited

U.S. PATENT DOCUMENTS

| 4,920,339 A | * | 4/1990 | Friend et al. .......... 340/825.52 |
| 5,745,493 A | * | 4/1998 | St. Clair ..................... 370/438 |
| 5,926,031 A | * | 7/1999 | Wallace et al. ............... 326/30 |
| 6,233,625 B1 | * | 5/2001 | Vander Kamp et al. ...... 710/10 |
| RE37,613 E | * | 3/2002 | Savage |
| 6,438,624 B1 | * | 8/2002 | Ku et al. ....................... 710/9 |

OTHER PUBLICATIONS

Small Computer System Interface—2 (SCSI—2), pp. 30–32, 40–41, 154–155, 390–391.*

* cited by examiner

*Primary Examiner*—Tim Vo
(74) *Attorney, Agent, or Firm*—Cochran, Freund and Young, LLC

(57) ABSTRACT

A method for communicating on a SCSI bus permits out-of-band addressing and communication for normally non-addressable devices such as SCSI expanders and terminators. The method remaps 18 SCSI data lines for out-of-band operation and manipulates no more than those data lines. Some of the data lines are remapped for purposes of out-of-band signaling and data transfers. Advantageously, manipulation of only the SCSI data lines prevents the possible response of a device on the SCSI network that does not support the out-of-band operations. Accordingly, the disclosed method is backward compatible with existing SCSI networks while allowing implementation of devices having the increased functionality of out-of-band communication.

9 Claims, 10 Drawing Sheets

| BIT | SP0 | SD7 | SD6 | SD5 | SD4 | SD3 | SD2 | SD1 | SD0 |
|---|---|---|---|---|---|---|---|---|---|
| Function | Res | Res | Res | Res | RXER | OBSL | SEND | TSTB | HSTB |

19, 12, 11, 10, 9

| BIT | SP1 | SD15 | SD14 | SD13 | SD12 | SD11 | SD10 | SD9 | SD8 |
|---|---|---|---|---|---|---|---|---|---|
| Function | Res | Data Byte ||||||||

8

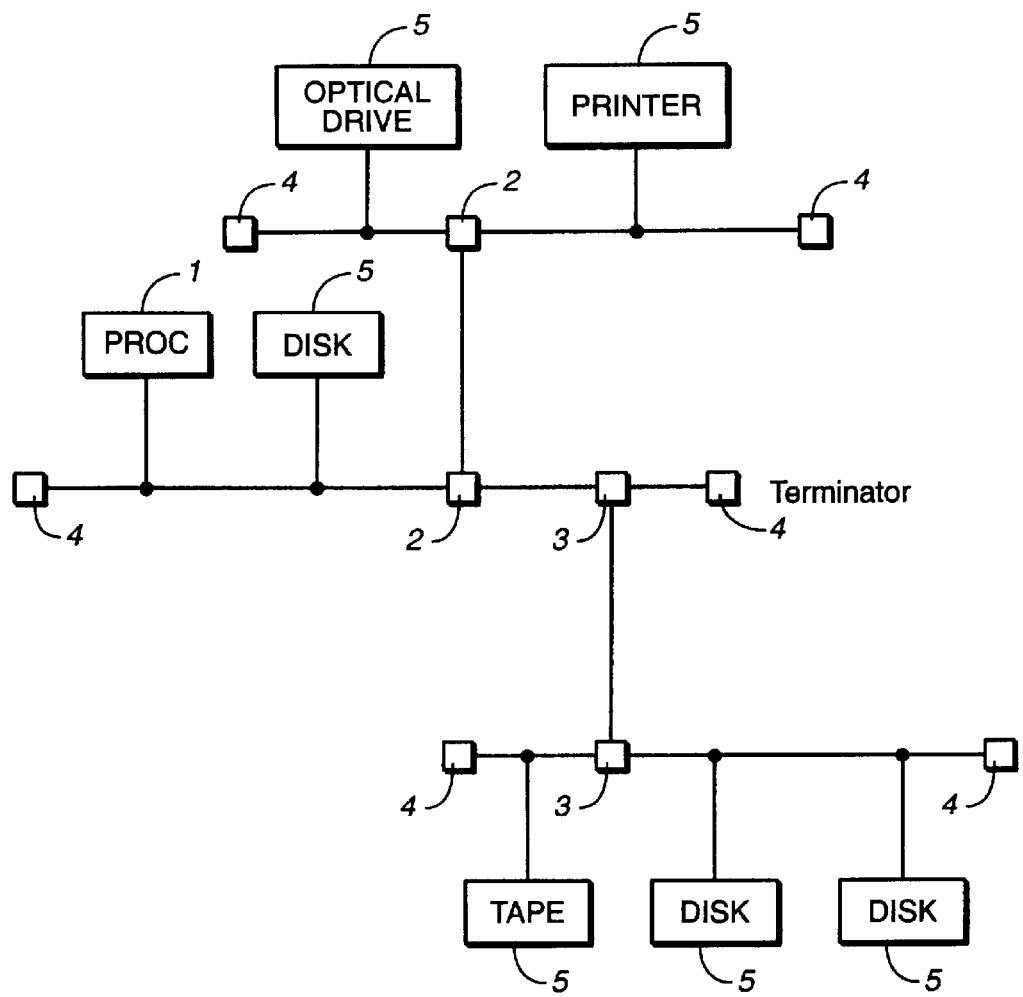
FIG._1

| BIT | SP0 | SD7 | SD6 | SD5 | SD4 | SD3 | SD2 | SD1 | SD0 |
|---|---|---|---|---|---|---|---|---|---|
| Function | Res | Res | Res | Res | RXER | OBSL | SEND | TSTB | HSTB |

| BIT | SP1 | SD15 | SD14 | SD13 | SD12 | SD11 | SD10 | SD9 | SD8 |
|---|---|---|---|---|---|---|---|---|---|
| Function | Res | | | | Data Byte | | | | |

FIG._2

| BIT | SP1 | SD15 | SD14 | SD13 | SD12 | SD11 | SD10 | SD9 | SD8 |
|---|---|---|---|---|---|---|---|---|---|
| Function | Res | Class Code | | Res | Destination ID | | | | |

FIG._3

| Code | Device Class |
|---|---|
| 000 | Reserved |
| 001 | Expanders / Repeaters |
| 010 | Terminators |
| 011 - 110 | Reserved |
| 111 | All Device types |

FIG._4

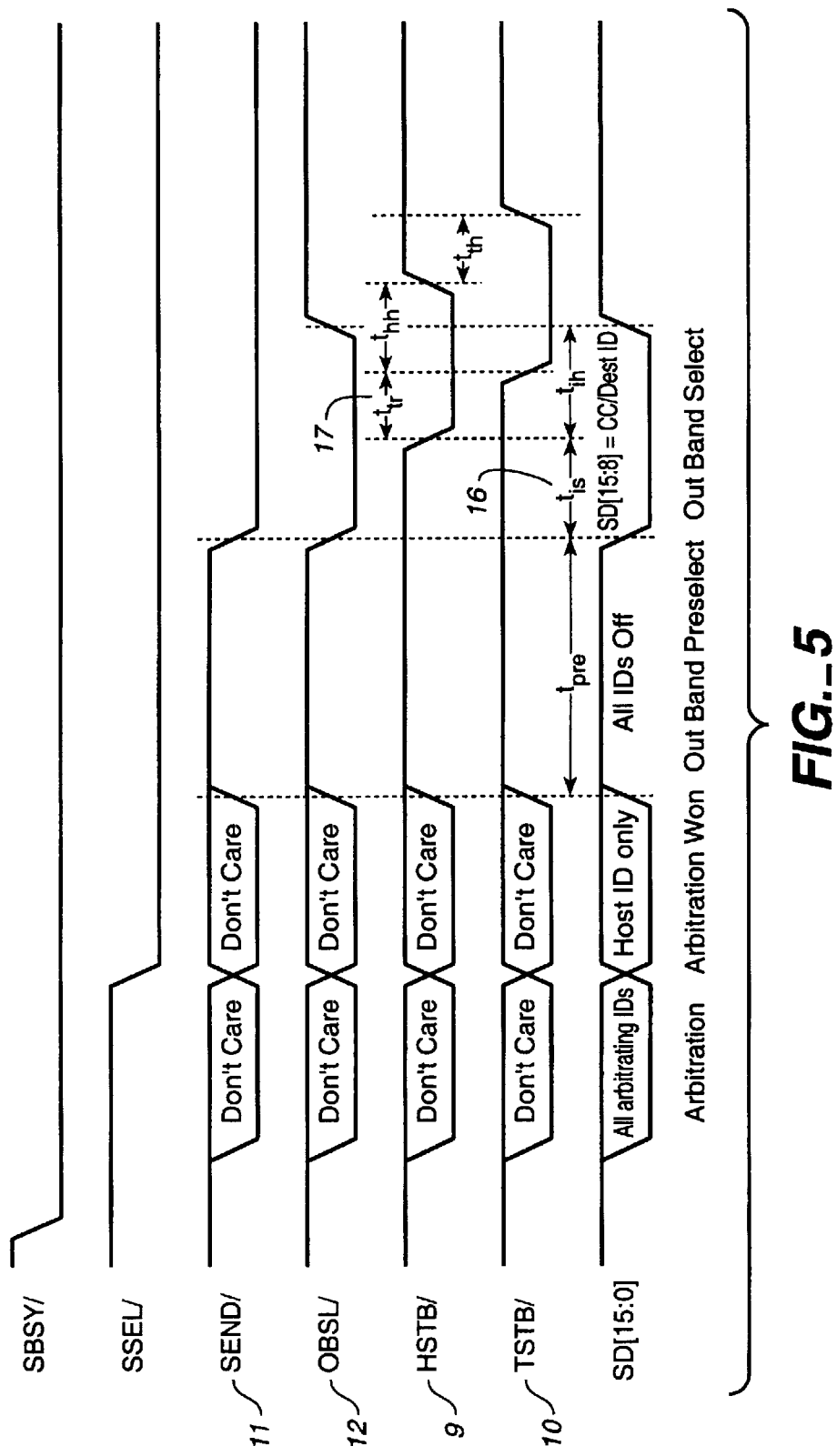
FIG._5

| Byte | SP1 | SD15 | SD14 | SD13 | SD12 | SD11 | SD10 | SD9 | SD8 |
|------|-----|------|------|------|------|------|------|-----|-----|
| 1 | Res | Res | | | | | | | |
| 2 | Res | | | Command Length | | | Command | | |
| 3 | Res | | | Data 1 | | | | | |
| -- | Res | | | -- | | | | | |
| N | Res | | | Data n | | | | | |
| Last | Res | | | CRC | | | | | |

FIG._6

| Code | Command |
|------|---------|
| 00000 | Reserved |
| 00001 | Margin Levels / Timing |
| 00010 | Identify Device |
| 00011 | Device Mode (Disable / Enable) |
| 00100 | Register Write |
| 00101 | Register Read |
| 00110-11111 | Reserved |

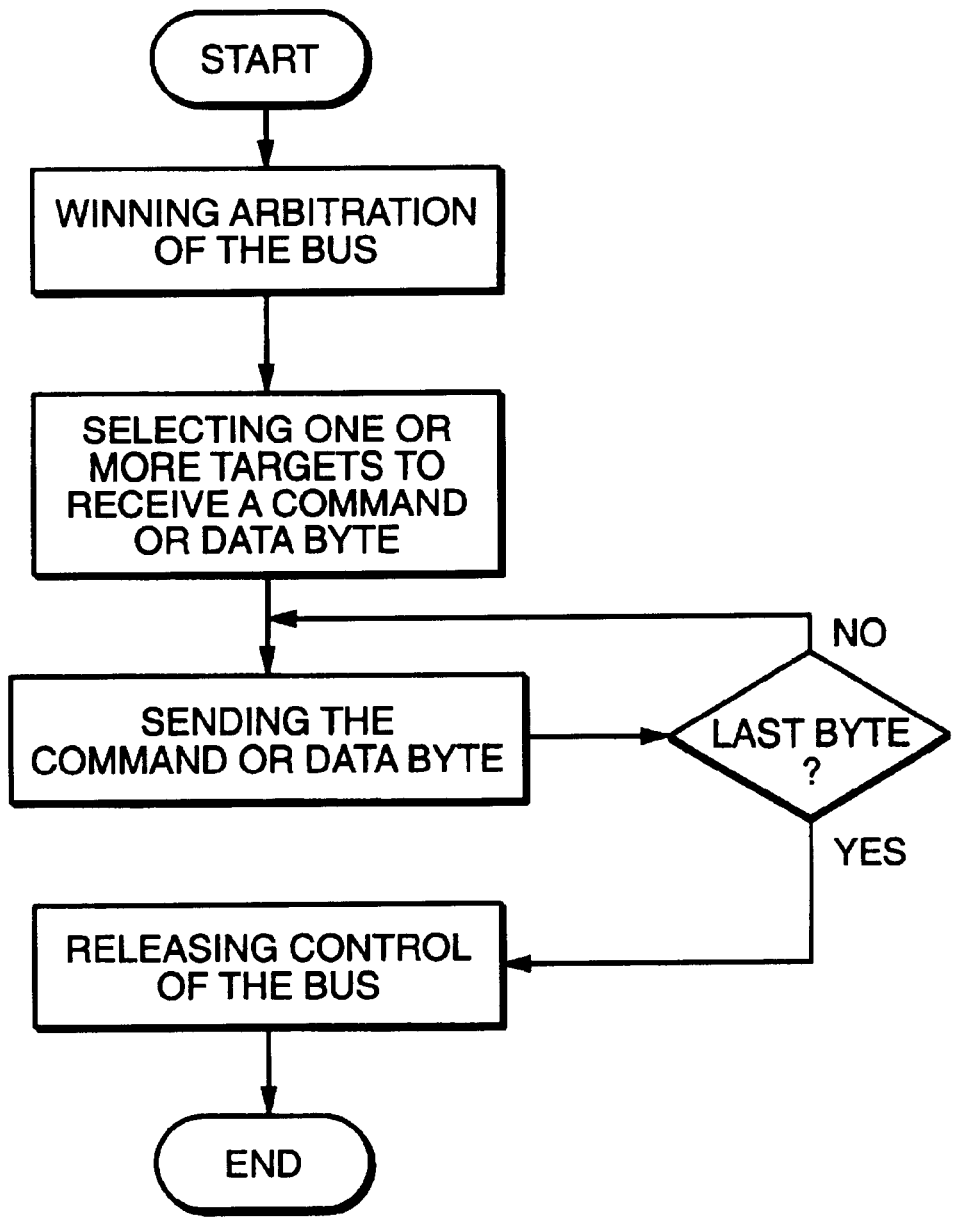
FIG._13

METHOD OF COMMUNICATING ON A NETWORK

CROSS REFERENCE TO RELATED APPLICATIONS

This application is a divisional and claims benefit of U.S. non-provisional application Ser. No. 09/431,606, entitled "METHOD FOR OUT-OF-BAND NETWORK COMMUNICATION," filed Nov. 1, 1999 by William K. Petty.

BACKGROUND OF THE INVENTION

1. Field of the Invention

The present invention relates to method of network communication and more particularly to a method for out-of-band communication on a SCSI network.

2. Background

Conventional SCSI buses perform network communication over a 50, 68 or 80 conductor cable. The present disclosure is directed to a discussion of the 68-conductor cable implementation of a SCSI network. The principles and teachings of the present invention, however, may be applied to other cables and other networks. The SCSI Parallel Interface 2 ("SPI-2") standard description for a 68-conductor cable implements a 16-bit data bus width. A segment of the network is defined as having at least one initiator or one target and two terminators at either end of the segment. Multiple segments may be used to make up the network. Expander devices are used to connect two segments together. Typical networks utilize 2–5 expanders. Each SCSI device on the network has a unique address identifier and a corresponding SCSI bit so that each device is individually addressable for specific I/O operations. In order to maximize the number of addressable devices on a segment, certain devices are not addressable and are considered "transparent" devices. An expander is an example of a "transparent" device and operates to pass network information from one segment to another. The expander, therefore, operates to both send and receive data without being a source or final destination of the data. A terminator is another example of a "transparent" device. Terminators maintain proper bus signal integrity by maintaining appropriate terminating impedances, but are neither an initiator nor a target of data in an I/O operation.

Two types of communication modes are helpful on the SCSI bus. In-band operation is defined as network communication between initiators and targets as necessary for I/O operations that are typical of computer network operation. Out-of-band operation is defined as the network communication used for service purposes where a system administrator may want to modify certain network characteristics in order to maintain communication reliability for in-band operations. As an example, the system administrator of a network may want to modify impedance levels, adjust voltage levels, or timing on one or more segments. It is desirable to be able to perform these tasks on both the addressable and "transparent" devices. One solution is to organize the network so that all SCSI devices, including the "transparent" SCSI devices, have an address and a corresponding SCSI identification bit. It is, however, undesirable to assign the transparent SCSI devices a SCSI identification bit because the assignment of the SCSI identification bit displaces one of the possible 16 devices that can otherwise populate a SCSI network. The transparent device that is using the SCSI bit uses it only for purposes of out-of-band operation rendering use of the addressing bit inefficient.

The SCSI standard and networks have enjoyed a certain amount of popularity. Accordingly, there is a large number of existing SCSI devices in use that are not able to support network functionality that is defined after the device is fielded. As many of the fielded SCSI devices, sometimes termed "legacy devices", have not reached the end of their useful life, it is important for network operations to be able to accommodate the presence of the legacy devices. Accommodation of a legacy device means that the legacy device is able to populate a network without responding to network operations that the legacy device does not support. This is important in order to assure that the oldest legacy device does not define the network functionality, but rather to permit increased functionality while assuring robust network operations.

A known solution to administration of SCSI addresses is the SCSI Configured Automatically ("SCAM") protocol. The SCAM protocol is defined to ease user problems with the configuration of SCSI identification addresses on an SCSI bus. The SCAM protocol calls for an initiator to isolate one or more SCAM tolerant targets to which it dynamically assigns an address. Disadvantageously, the SCAM protocol may not support all legacy devices. The SCAM protocol manipulates certain ones of the SCSI control lines giving rise to the possibility that a SCSI device that does not support the SCAM protocol will respond inappropriately to the SCAM process and compromise the operation of the network.

There is a need, therefore, for a method of network communication to permit individual addressing of devices that are otherwise "transparent" during in-band operation while minimizing the possibility of inappropriate response by SCSI devices that do not support the out-of-band operation.

SUMMARY

According to one aspect of an embodiment according to the teachings of the present invention, a method for communication between a host and one or more targets on a network comprises the steps of communicating between the host device and the one or more target devices on a bus in an in-band communications mode. The in-band communications mode operates according to a predefined standard, the standard defining the bus as having data lines and signaling lines. The method further comprises the steps of initiating an out-of-band communications mode and utilizing the data lines for the out-of-band communication mode. In the out-of-band communications mode, one or more of the data lines is assigned a signaling function. The method further comprises returning to the in-band communications mode.

According to another aspect of an embodiment according to the teachings of the present invention, a network comprises at least one initiator and at least one target communicating via a SCSI bus. The SCSI bus has a predefined busy line, a predefined select line and a plurality of predefined data lines. The method for communicating comprises the steps of winning arbitration of the bus using the busy line and the select line and selecting one or more targets to receive a command. The method further comprises sending the command to the one or more selected targets, the steps of selecting and sending manipulating no more than the predefined data lines. The method further comprises the steps of releasing control of the bus.

According to another aspect of an embodiment according to the teachings of the present invention, a method for communicating on a network comprises the steps of utilizing a network communications standard for in-band communications. The method further comprises the steps of remapping data lines as defined in the standard to a different set of functions and utilizing the remapped data lines for an out-of-band communications mode. Thereafter, the method comprises the step of restoring the bus to in-band communications.

One of the advantages of a method according to the teachings of the present invention is that all devices on a SCSI network may be individually addressed for purposes of out-of-band operations. Devices on the SCSI network, such as expanders and terminators, that are not addressable during in-band operations, are uniquely addressable during out-of-band operations. Advantageously, the out-of-band operations do not stimulate the SCSI signaling lines. The benefit of the failure to stimulate the SCSI bus control lines is avoidance of a spurious response from a SCSI device that does not support out-of-band operation. Those devices on the network that do not support the out-of-band operations are left undisturbed until in-band operation resumes. Accordingly, a method according to the teachings of the present invention accommodates legacy devices by assuring non-responsiveness from those devices not supporting out-of-band operations while also providing the increased functionality for those devices on the network that do support out-of-band operations.

BRIEF DESCRIPTION OF THE DRAWINGS

FIG. 1 is a symbolic representation of a 3-segment SCSI bus with two expanders.

FIG. 2 is a tabular representation of the SCSI bus lines used in out-of-band communications and the relative mapping to out-of-band signals according to the teachings of the present invention.

FIG. 3 is a tabular representation of the SCSI bus lines used in the selection phase of the out-of-band operation according to the teachings of the present invention.

FIG. 4 is a tabular representation of the class codes used in the out-of-band selection phase according to the teachings of the present invention.

FIG. 5 is a graphical representation of the digital waveforms and relative timing for the out-of-band selection phase according to the teachings of the present invention.

FIG. 6 is a tabular representation of the SCSI bus lines used in the command phase of the out-of-band operation according to the teachings of the present invention.

FIG. 7 is a tabular representation of the commands and corresponding binary code representation used in the out-of-band command phase according to the teachings of the present invention.

FIG. 13 is a flow chart of a method according to the teachings of the present invention.

DETAILED DESCRIPTION OF THE PREFERRED EMBODIMENTS

Figure 8:
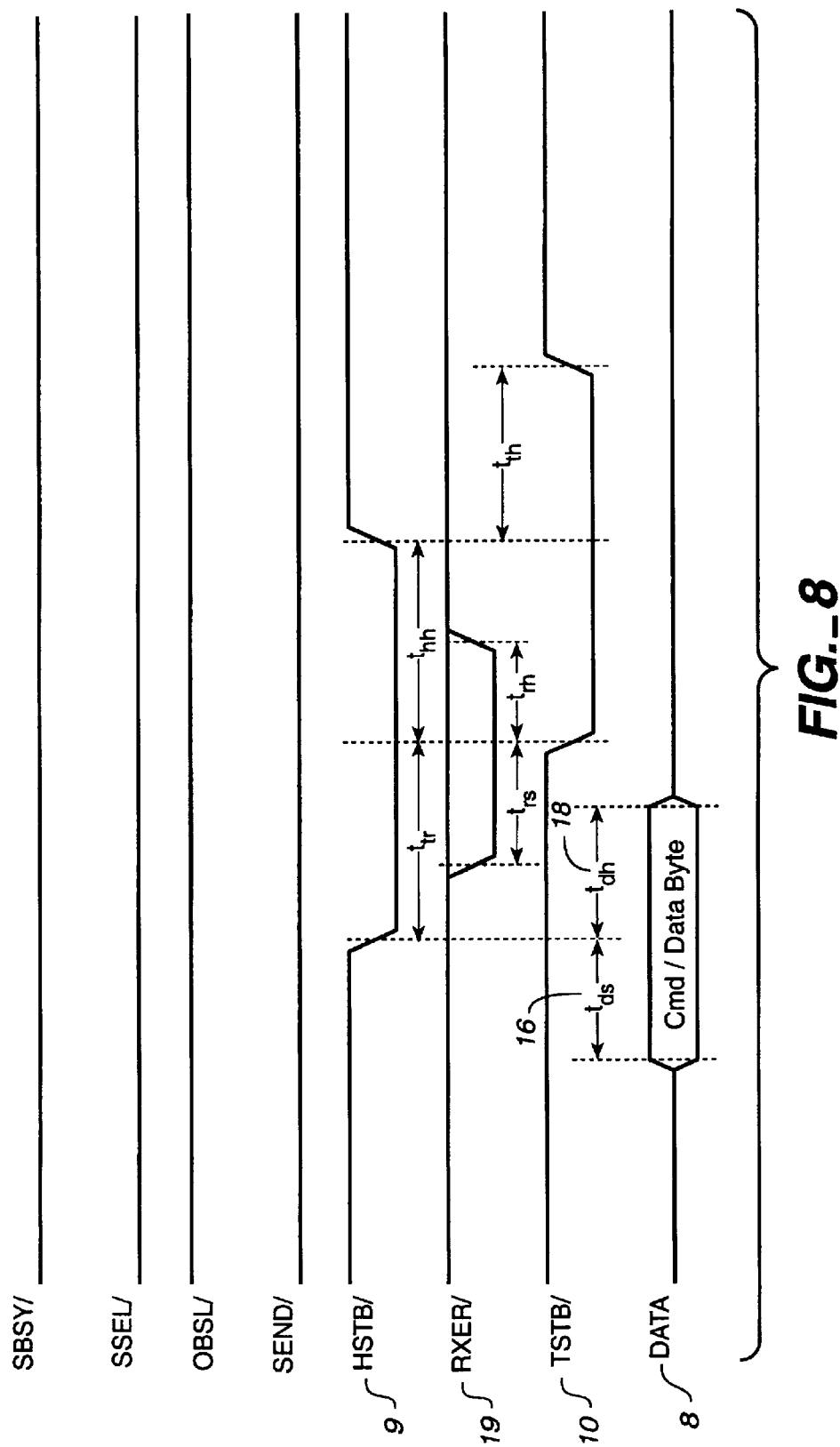
FIG. 8 is a graphical representation of the out-of-band data send phase according to the teachings of the present invention.

With specific reference to FIG. 1 of the drawings, there is a shown a conventional Small Computer System Interface ("SCSI") network in which there is a single initiator 1, first and second expanders/repeaters 2,3, a plurality of targets 5, and an appropriate number of terminators 4. All devices on the network are attached to a SCSI bus 6. The embodiment described is directed to a SCSI network using a P-type or 68-conductor cable which has a 16-bit data bus width. During conventional in-band operation, the expanders 2,3 and terminators 4 are "transparent" devices. That is to say, that these devices are not normally addressed during in-band communication and operation of the expanders 2,3 and terminators 4 does not interfere with communication between the initiator 1 and the target or targets 5. Additionally, it is not necessary for the initiator 1 and targets 5 to have a priori knowledge of the presence of the expanders/repeaters 2,3 and terminators 4 on the network in order for the network to operate effectively. Conventional in-band operation of the SCSI bus is described in the SCSI-standard ANSI document X3.1331:1994 and the SCSI Parallel Interface-2 (SPI-2) ANSI document X3.302:1999, the contents of which are both specifically incorporated by reference herein.

Out-of-band communications mode is defined for purposes of this disclosure as those communications between devices on a SCSI network that occur outside of the protocol defined by the SCSI standard. The protocol for the out-of-band communications mode is different than the SCSI protocol and occurs at a time different than the in-band communications mode. Out-of-band communications are useful for setting network margins to adapt the specific electrical and timing parameters for a particular network. The adjustments do not affect the operation according to the ANSI SCSI standard, but adjustments can assure adequate performance under a variety of network conditions and permit optimization of a specific network at any point in time. In order to make all necessary adjustments to network parameters, it is desirable specifically and uniquely to address the "transparent" devices out-of-band in order to send specific commands to these important devices. Addressing of the "transparent" devices is not possible in the in-band communications mode, but is possible in the out-of-band communications mode. Addressing during only the out-of-band communications mode is efficient because the transparent devices need only be addressed when the in-band communications mode is not occurring. Out-of-band commands, for example, may remotely adjust the electrical and timing parameters associated with the devices. As an example, a system administrator may want to adjust the terminating impedances in two or more terminators 4 to maximize the impedance match of the terminator 4 to that of a cable to which it is attached. It is practical to make this kind of adjustment before resuming operation using the standard SCSI protocol. Advantageously, when in-band operations resume, the recently addressed "transparent" devices do not displace a SCSI address. As an example, the terminator 4 is normally "transparent" and non-addressable during in-band SCSI network operation and, consequently, the "transparent" device does not use a SCSI identification bit. The terminator 4, therefore, does not displace a target device 5 that might otherwise fit on the network. There is a need, however, to address the terminator 4 in an out-of-band operation for remote adjustment of its electrical parameters such as impedance level.

With specific reference to FIG. 2 of the drawings, there is shown a diagram of the 18 SCSI data lines 7 predefined for in-band operation in the SCSI-2 and SPI-2 standards. Each of the 18 SCSI data lines is remapped for purposes of out-of-band operation. Bit mapping for in-band operation remains according to convention. As seen in FIG. 2 of the drawings SD[15:8] are mapped as an 8-bit data byte 8, SD0 9 is mapped as signal line host strobe or HSTB, SD1 10 is mapped as signal line target strobe or TSTB, SD2 11 is mapped as signal line SEND, SD3 12 is mapped as out-of-band select or OBSL, SD4 13 is mapped as receive error or RXER, and SP[0:1] and SD[7:5] are mapped as reserved for purposes of adding functionality and are not used in the present embodiment of the out-of-band communications. The out-of-band communication process manipulates only the remapped 18 data lines. The SCSI busy ("BSY") 100 and select ("SEL") 200 lines (shown in FIG. 5) are used for purposes of SCSI bus arbitration to begin out-of-band communications and for purposes of out-of-band deselection to terminate out-of-band operations. During in-band communication, the initiator is in full control of the communication functions. For example, the initiator begins the out-of-band operations and if an error is detected or if the communications times out, it is the initiator that returns the bus 6 to the bus free stage as defined in the SCSI-2 and SPI-2 standards.

An out-of-band targeted selection process permits a host to select a single target for out-of-band communication. The out-of-band target selection process begins with a conventional bus arbitration cycle as defined in the SPI-2 standard using the 18 SCSI data lines 7 as well as the busy ("BSY") 100 and select ("SEL") 200 lines. Arbitration permits an initiator of the out-of-band operation to gain control of the bus 6 for purposes of initiating network communication. Accordingly, the initiator of the out-of-band operation must be a device with a conventionally defined SCSI ID. The busy ("BSY") 100 and select lines ("SEL") 200 are not used for out-of-band communications mode after the initiator wins arbitration of the bus 6. An out-of-band process initiator is referred to in the remainder of this disclosure as the host 1. With specific reference to FIG. 5 of the drawings, when arbitration is won by the host 1, the host ID is present on the data lines 7 of the bus 6. The host 1 removes the host ID by negating the data lines 7, SD[15:0]. The SD[15:0] lines are negated for at least an out-of-band preselect time period 20, 25–50 nsec as an example. As negation of all SCSI IDs is not conventional, it is an indication to all targets that support the out-of-band communications mode to respond using out-of-band protocol. The devices that support out-of-band communications, however, respond only if the SCSI ID negation is detected for the out-of-band preselect time 20. It is desirable, therefore, that all devices that support out-of-band communications include logic to detect the negation condition. The out-of-band preselect time period 20 provides an extra margin of safety to assure that response is given by only those devices on the bus 6 supporting out-of-band communication and response is not given by those devices on the bus 6 that do not support out-of-band operation. After the SCSI ID negation for the out-of-band preselect time period 20, the host 1 then asserts the remapped out-of-band select line 12, OBSL/SD3, and the send line 11, SEND/SD2. At the same time, the host 1 places a requested target's class code identifier 13 on SD[15:13] and destination identifier 14 on SD[11:8] to uniquely address a single target 5 on the bus 6. FIG. 4 shows the class code identifier values 15 and their corresponding meanings. As one of ordinary skill can appreciate, the actual values assigned are arbitrary as long as all devices that support out-of-band operation operate against the same value assignments. The host 1 places the class code identifier 13 and destination identifier 14 on the data lines for a minimum of a set up time 16, for example 25 nsec. The host 1 then asserts the host strobe signal line 9 to strobe the class code identifier value 15 and the destination identifier value (not shown and unique to each device) into the selected target device 5. The host strobe signal 9 is an edge triggered signal. It is prudent, however, to hold the data positions for a minimum of an out-of-band hold time 17, such as 25 nsec. The out-of-band select signal 12, OBSL/SD3, may be released at the same time the data byte 8 is released. Each target on the bus 6 that supports out-of-band communications is equipped with a class identifier value 15 and a unique destination identifier value (not shown). The class identifier value 15 is a code known to each device that reflects the category of device. Accordingly, more than one device on the bus 6 may have the same class code identifier value 15. As an example, all terminators 4 could have the same class code identifier value of 010 binary. Each target device, therefore, contains logic that permits the device to test for a match between the class code identifier 13 presented by the host and the class code identifier value 15 corresponding to the device. If the values match, the target device 5 recognizes that the target selection process may refer to it and proceeds to check the destination identifier 14. The target device 5 contains similar logic to check for a match between the destination identifier 14 and the destination identifier value corresponding to the device. If they match, the target device 5 recognizes that it has been selected by the host 1 to receive a command. The target then becomes a selected target. In the selection process for a targeted command and with further reference to FIG. 5 of the drawings, the host 1 waits for up to one handshake timeout delay time for the selected target to assert the target strobe signal line 10, TSTB/SD1 indicating receipt of the data. Upon detection of the asserted target strobe signal line 10, the host 1 negates the HSTB 9 signal line for at least one deskew delay time period to complete the handshake. At this point, out-of-band selection for a specific target capable of responding to the out-of-band selection according to the teachings of the present invention is complete. In the event that the host 1 does not detect negation of the target strobe signal line 10, TSTB/SD1, the host 1 proceeds to an out-of-band deselection process without beginning an out-of-band command phase.

Figure 12:
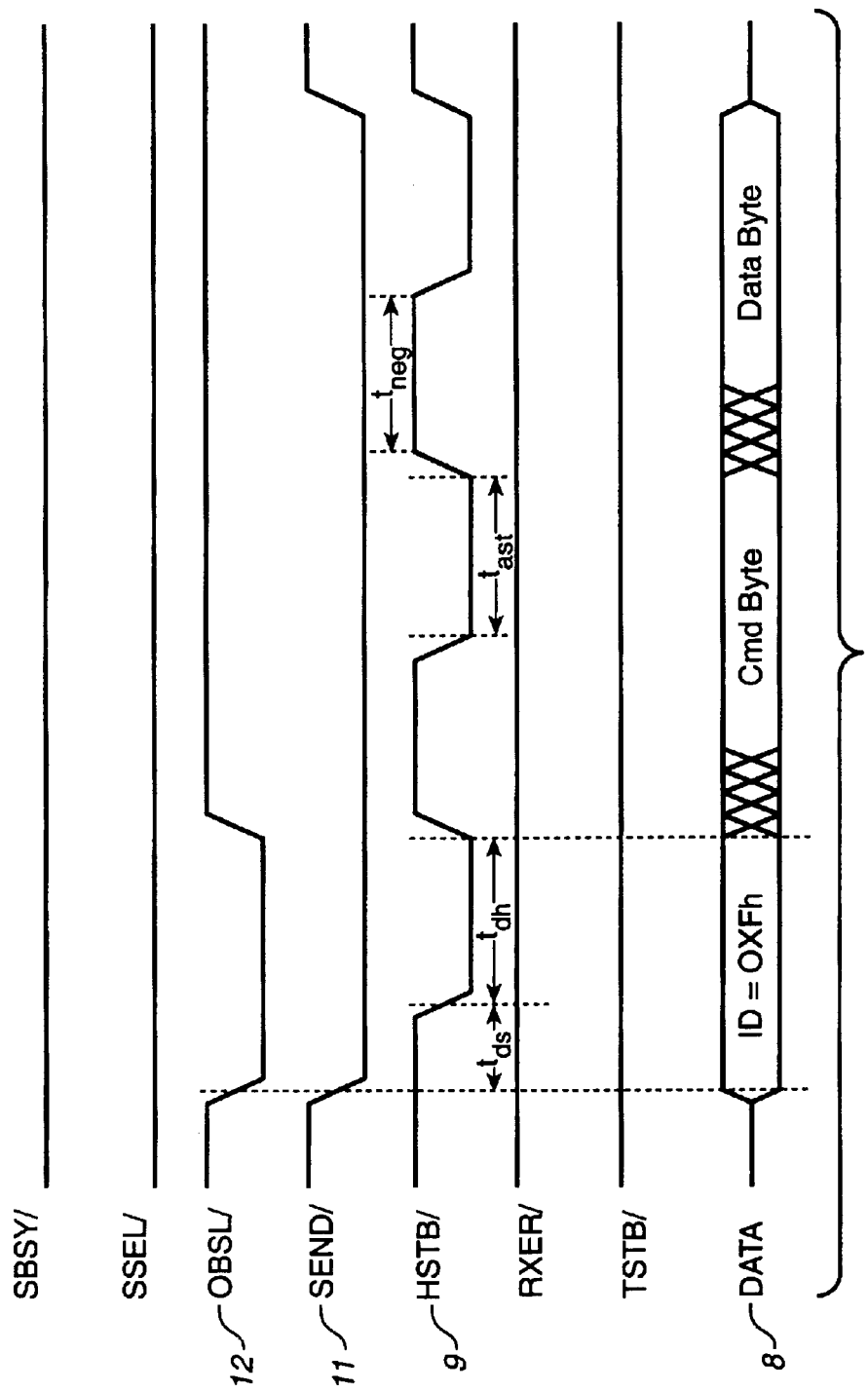
FIG. 12 is a graphical representation of the digital waveforms and relative timing for the out-of-band broadcast data send phase according to the teachings of the present invention.

The out-of-band broadcast selection process permits a host to select two or more targets for out-of-band communication. Broadcast operation permits the host 1 to address and communicate to one or more target devices 5 at the same time. As in the targeted selection process, the broadcast selection process begins with the host 1 winning control of the bus 6 through conventional bus arbitration as defined in the SCSI-2 and SPI-2 standards using the select 100 and busy 200 SCSI signal lines. After the host 1 wins arbitration, the host 1 indicates out-of-band operation by negating the SCSI source ID for a minimum of the out-of-band preselect time 20. The out-of-band select 12 and send 11 lines are then asserted. With specific reference to FIG. 12 of the drawings, the host 1 may indicate a broadcast operation by presenting the class code identifier 13 for a single device category and by presenting the destination identifier value 15 of Fhex (1111 binary) to represent selection of all devices in the class. The host 1 refers to the targeted device class by presenting one of the class code identifier values 15 as shown in FIG. 4 of the drawings, in the data positions SD[15:13] as shown in FIG. 3 of the drawings. After a minimum of a deskew delay time 21, the host strobe signal line 9 is asserted to strobe the identifiers on SD[15:8] into the selected targets. The host strobe signal line 9 is then negated after a minimum of an out-of-band hold time 22. The out-of-band select signal line 12 is then negated. The out-of-band select negation may or may not occur after a deskew delay time. Out-of-band selection for a broadcast command is complete at this point.

After appropriate selection of a single target for out-of-band communication by selective addressing as previously described, the host begins a targeted out-of-band command/data send phase. In the event of a broadcast selection process, the host enters the broadcast out-of-band command/data send phase, which is described later on in the present disclosure. With specific reference to FIG. 8 of the drawings, the send signal line 11, SD2, remains asserted from the selection phase and indicates a data direction flowing from the host 1 to the selected target 5. The host 1 then places a command byte 27 or an associated data byte on SD[15:8] 8. With specific reference to FIGS. 6 and 7 of the drawings, there is shown a format for the targeted out-of-band command phase as sent by the host 1 and values assigned to various commands. As one of ordinary skill in the art will appreciate, the actual values assigned are a matter of design choice and do not limit the scope of the present invention. With specific reference to FIG. 8 of the drawings, after a minimum of the deskew delay time 16, the host strobe signal line 9, HSTB/SD0, is asserted to strobe the command or data byte into the selected target device. The host 1 holds the command or data byte 8 valid for at least the set up time 16 prior to the assertion of the host strobe signal line 9, HSTB/SD0. The host strobe signal line 9, HSTB/SD0, being an edge triggered signal, it is prudent to hold the command or data byte 8 valid for a period of time to ensure strobing of the proper data. After the host strobe signal line 9, HSTB/SD0 is asserted, the command or data byte 8 is held valid for at least a hold time 17, for example 25 nsec. The target then asserts the target strobe signal line 10 which acknowledges receipt of the data byte 8 and strobes a receive error bit 19, RXER/SD4, into the host 1. The host 1 then negates the host strobe signal line 9, HSTB/SD0. The host 1 then waits for up to one handshake timeout delay 18 for the target to negate the target strobe signal line 10, TSTB/SD1, to complete the handshake. If the receive error bit 19 is set, the host 1 determines the appropriate response. If the receive error bit 19 is not set, the host 1 then repeats the handshaking process with the selected target 5 to further send to the target a length indicating a number of bytes in the current command. In the absence of an error, the host 1 and selected target 5 continue communicating to complete transmission of all bytes in the current command. The last byte sent is a cyclic redundancy check ("CRC") byte for purposes of communication error detection. Any CRC polynomial is appropriate and does not have any bearing on the scope of the present invention. After the last byte is sent, the host 1 releases control of the data byte/SD[15:8] 8 for a minimum of one bus settle delay time as defined in the SCSI-2 and SPI-2 standards. The host 1 thereafter negates the send signal line 11, SD2, to complete the out-of-band targeted command phase.

Figure 9:
FIG. 9 is a tabular representation of the SCSI bus lines used in the out-of-band data receive phase according to the teachings of the present invention.
Figure 10:
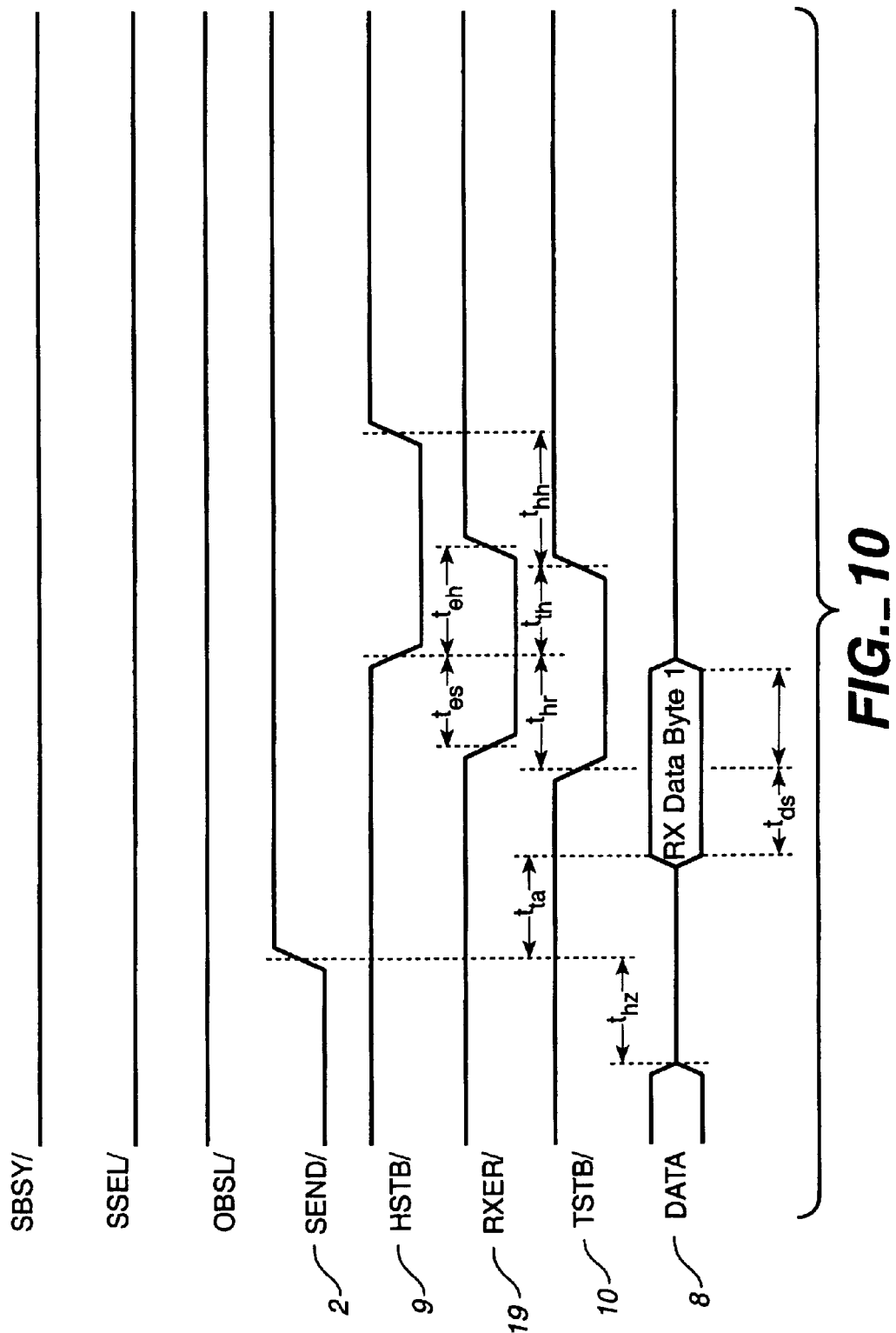
FIG. 10 is a graphical representation of the digital waveforms and relative timing for the out-of-band data receive phase according to the teachings of the present invention.

With specific reference to FIGS. 9 and 10 of the drawings, certain ones of the host commands may require information communicated from the selected target 5 back to the host 1. Accordingly, after the command is sent to the selected target 5, the host 1 may request an out-of-band data receive phase by negating the send signal line 11, SEND/SD2. The selected target 5 waits at least one bus settle delay time before driving the data byte 8. The host 1 waits up to one handshake timeout delay time for a response from the selected target in the form of an assertion of the target strobe signal line 10, TSTB/SD1. Assertion of the target strobe signal line 10, TSTB/SD1, indicates to the host 1 that the selected target has presented the data byte 8. FIG. 9 of the drawings, shows a tabular representation of bit mapping for the out-of-band data receive phase. The selected target 5 places the data byte 8 on the SD[15:8] lines representing the number of bytes to follow to complete the data receive phase. The target strobe signal line 10, TSTB/SD1, is an edge triggered signal. Accordingly, asserting the target strobe signal line 10, TSTB/SD1, strobes the data byte 8 to the host 1. The host 1 acknowledges receipt of the data byte 8 by asserting the host strobe signal line 9, HSTB/SD0. If the host 1 asserts the receive error bit 19, RXER/SD4, it indicates that the host 1 did not properly receive the data byte 8. The host 1 then determines the appropriate further course of action, for example, initiating a deselection process, arbitrating for control of the bus 6, and retrying. As one of ordinary skill will appreciate, other responses may also be appropriate. If the selected target 5 did not understand the command during the command send phase or was otherwise unable to process the command, the selected target 5 sets the reject bit 23, REJ/SD15, in the first data byte 8 of the data receive phase. In the event that the reject bit 23 is set, the host 1 determines an appropriate response. In the event that the reject bit 23 is not set, the selected target 5 holds the data byte 8 valid for the set up time 16, for example 25 nsec. When the selected target 5 detects the asserted host strobe signal line 9, HSTB/SD0, the selected target 5 holds the data byte 8 valid for at least the hold time 17 after the target strobe signal line 10, TSTB/SD1, edge. The host 1 presents the receive error bit 19, RXER/SD4, for the set up time before asserting the host strobe signal line 9, HSTB/SD0, in response to the target strobe signal line 10, TSTB/SD1, assertion. The selected target 5 then negates the target strobe signal line 10, TSTB/SD1. The host 1 negates the host strobe signal line 9, HSTB/SD0, after detecting target negation of the target strobe signal line 10, TSTB/SD1, or after one handshake timeout delay time, whichever occurs first. If the receive error bit 19, RXER/SD4, is set indicating that the host 1 did not properly receive the data byte 8, the host 1 determines an appropriate response. If the receive error bit 19, RXER/SD4, is not set, the process continues by having the target place the next data byte 8 on the data lines SD[15:8] and the previously described handshake process is repeated. In the absence of an error condition, this process of the target 5 placing the data byte on the SD[15:8] lines and completing the handshake repeats until all of the target data has been sent.

Figure 11:
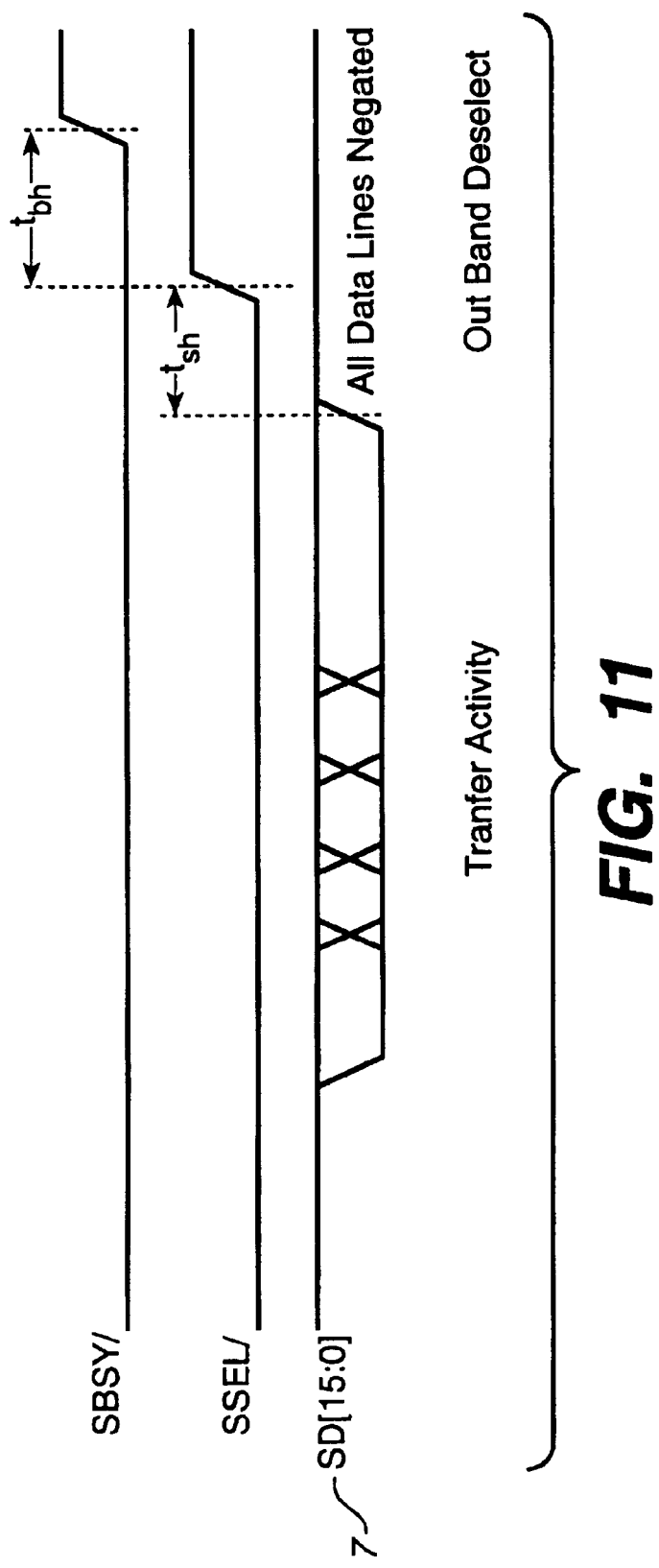
FIG. 11 is a graphical representation of the digital waveforms and relative timing for the out-of-band deselection phase according to the teachings of the present invention.

The out-of-band deselection process terminates all out-of-band communication and is initiated by the host 1. The host initiates deselection by releasing all data lines SD[15:0] 7, SP1, and SP0 for at least one bus settle delay time. With specific reference to FIG. 11 of the drawings, the host 1 then releases the select line 200, SSEL, which deselects all currently selected out-of-band targets. The host 1 waits another bus settle delay time before releasing the busy signal 100, SBSY, to return the SCSI bus 6 to the bus free condition as defined in the SCSI-2 and SPI-2 documents.

The out-of-band broadcast command/data send phase follows the out-of-band broadcast selection phase described hereinabove wherein the host 1 does not wait for the target strobe 10, TSTB/SD1, signal assertion and completion of the handshake, but does wait for at least one bus settle delay time before driving any of the bus lines 7. With specific reference to FIG. 12 of the drawings, the send signal line 11, SEND/SD2, remains asserted from the out-of-band selection phase indicating a data direction from the host 1 to the target or targets. The host 1 places the out-of-band command or data on SD[15:8] 8 according to the bit mapping shown in FIG. 6 of the drawings. The host 1 waits at least one deskew delay time and asserts the host strobe signal line 9, HSTB/SD0, which strobes the data byte 8 into the selected targets. After a minimum of one out-of-band hold time, for example 25 nsec, the host 1 negates the host strobe signal line 9, HSTB/SD0, and then changes the data byte 8 as appropriate. The process of placing the data byte 8 on SD[15:8] and strobing the data byte 8 into the target or targets repeats until all data bytes have been sent.

Modifications that are within the spirit and scope of the present invention will occur to one of ordinary skill in the art. As an example, remapping of data lines for out-of-band operations is applicable to other networks and bus sizes. Discussion of the preferred embodiments does not limit the scope of the invention, the scope invention being defined only by the appended claims.

What is claimed is:

1. A method for communicating on a network, the network comprising at least one initiator and at least one target device communicating via a bus, said bus including a predefined set of control lines that comprises a predefined busy line and a predefined select line, said bus further including a plurality of predefined data lines, the method comprising the steps of:

winning arbitration of said bus using said predefined busy line and said predefined select line, selecting at least one target device to receive a command by manipulating at least one of said predefined data lines and not manipulating said predefined set of control lines, sending said command to said at least one target by manipulating at least one of said predefined data lines and not manipulating said predefined control lines, and releasing control of the bus.

2. A method for communicating on a network as recited in claim 1, the step of sending further comprising broadcasting said command on said bus to at least one selected target.

3. A method for communicating on a network as recited in claim 1, the step of sending further comprising the steps of launching onto said bus a destination identifier value and then sending said command for receipt by only those targets having a device identifier with a value matching said destination identifier value.

4. A method for communicating on a network as recited in claim 1, the step of sending further comprising the steps of launching onto said bus a class code identifier value and then sending said command for receipt by only those targets having a device class identifier with a value matching said class code identifier value.

5. A method for communicating on a network as recited in claim 1, the step of sending further comprising the steps of launching onto said bus a class code identifier value to indicate selection of a selected class of device and a destination identifier value, said destination identifier value indicating all targets in the selected class of devices.

6. A method for communicating on a network as recited in claim 1, and further comprising the step of negating all of said predefined data lines to indicate an out-of-band communications mode to said at least one target device.

7. A method for communicating on a network as recited in claim 1, the step of sending further comprising the step of utilizing one of said predefined data lines as a host strobe and one of said predefined data lines as a target strobe, said host strobe and said target strobe working in conjunction with each other to transfer data from said host to said target in a closed handshake.

8. A method for communicating on a network as recited in claim 1, the step of sending further comprising the step of utilizing one of said predefined data lines as a host strobe to transfer data from the host to at least one selected target.

9. A method for communicating on a network as recited in claim 3, the step of launching further comprising utilizing a plurality of bits to represent a binary number for said destination identifier.

* * * * *